(12) United States Patent
Brodhun

(10) Patent No.: US 6,181,338 B1
(45) Date of Patent: *Jan. 30, 2001

(54) APPARATUS AND METHOD FOR MANAGING WINDOWS IN GRAPHICAL USER INTERFACE ENVIRONMENT

(75) Inventor: Mark Andrew Brodhun, Byron, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/166,824

(22) Filed: Oct. 5, 1998

(51) Int. Cl.[7] ........................... G06F 13/00
(52) U.S. Cl. ............................. 345/342
(58) Field of Search .................. 345/342

(56) References Cited

U.S. PATENT DOCUMENTS

| | | | |
|---|---|---|---|
| 5,113,517 | * 5/1992 | Beard et al. | 345/340 |
| 5,172,326 | * 12/1992 | Campbell et al. | 364/470 |
| 5,227,771 | * 7/1993 | Kerr et al. | 345/342 |
| 5,870,090 | * 2/1999 | Takai et al. | 345/340 |

* cited by examiner

*Primary Examiner*—Ba Huynh
(74) *Attorney, Agent, or Firm*—S. Jared Pitts; Lori Howland; Roy W. Truelson (57) ABSTRACT

The preferred embodiments of the present invention provide a method and apparatus for managing and controlling the size and location of windows in a GUI-based computer system. Specifically, a window control mechanism is provided to enhance the basic functional features of a window in any windowing environment. By interacting with the window control mechanism, a user can quickly and easily relocate and resize a window without unnecessary mouse movement. In one preferred embodiment of the present invention, the user invokes the window control mechanism by positioning the cursor over the title bar of a window and using both buttons of a two button mouse. In another preferred embodiment of the present invention, the user invokes the window control mechanism by positioning the cursor over a window decoration and using both buttons of a two button mouse. Yet another preferred embodiment of the present invention allows the user to specify a keyboard keystroke combination to invoke the window control mechanism.

18 Claims, 6 Drawing Sheets

APPARATUS AND METHOD FOR MANAGING WINDOWS IN GRAPHICAL USER INTERFACE ENVIRONMENT

BACKGROUND OF THE INVENTION

1. Field of the Invention

The present invention relates in general to user interfaces for computers. More specifically, the present invention relates to managing window behavior in graphical user interfaces.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One of the most important developments in making computers not only more powerful, but easier to use, was the development of sophisticated user interfaces. Early computer systems were programmed with a series of switches or buttons and provided little relevant feedback during the operation of the computer system. This type of interface proved cumbersome and, accordingly, increasingly more functional and interactive interfaces were developed to extend the functionality of computer systems.

One very popular user interface, that ultimately gained widespread adoption on many different computer systems, was the "command line interface." Using a command line interface, the user would interact with the computer system by typing a specific command on a keyboard to instruct the computer regarding the desired operation to be performed. The command line interface was not intuitive, however, and still limited the use of computers to those who had the time and desire to learn a large number of relatively cryptic commands.

Recognizing the growing need for a more user-friendly interface, computer engineers and programmers developed the Graphical User Interface (GUI). A GUI uses visual representations of common items to allow a user to operate a computer system. In most GUI-based systems, various icons, symbols, menus, etc. are manipulated or activated by a computer user via a pointing device (e.g., a mouse, a trackball) which allow the user to give instructions to the computer. The movement of the pointing device is usually translated to the movement of an animated arrow or cursor, displayed on the computer screen. By moving the mouse or other pointing device, the user can position the cursor at various locations on the computer screen. Then, by activating a button on the mouse, the user can invoke various commands and options.

The various graphical elements of a GUI are usually designed to be somewhat consistent and self-explanatory, thereby making it as easy as possible for a typical user to perform common computer system functions. Over a period of several years, many visual components of GUI-based systems have become fairly standardized and most graphical interfaces have specific elements which have become somewhat universal. For example, almost all GUI-based systems employ pull-down menus, button bars, and windows.

The use of windows in a GUI-based system is practically ubiquitous for all modern computer systems. Almost all graphical interfaces display documents and program interface elements in a portion of the screen called a window. Indeed, the use of windows as an interface element has become so popular that it is difficult to imagine a computer program that does not employ some type of windowing environment. In fact, with the advent of multi-tasking and multi-processing computer environments, it is most common to see a computer screen littered with 3, 4, 8, 10 or more overlapping windows open and in use at any given time. With the advent of inexpensive memory and multi-processor based systems, multiple windows may be used to display the process of multiple tasks, all executing simultaneously.

Ostensibly, the adoption of the GUI and the use of GUI elements such as windows effectively increase the ease of use for a computer system and increase the productivity of the users of these computer systems. However, the use of graphical interface elements in general and windows in particular have, in themselves, led to some inefficiencies in the way users interact with a computer system via a GUI. For example, if a user opens more than one or two windows on a computer screen, the later opened windows tend to obscure the earlier opened windows. Often, it is a requirement that multiple windows or portions of the window(s) must be viewed simultaneously. Although there are controls and other navigational devices available to place and size windows, these known methods involve an undesirable amount of repetitive hand, wrist, and arm movements. This process can be very time-consuming, counter-productive, and frustrating for the user. In addition, given the prevalence of repetitive motion disorders such as carpal tunnel syndrome, reduction of unnecessary movement is highly desirable.

Of all possible operations in a typical GUI environment, window moving and sizing are among the most common and user interactive. While many keyboard-based shortcuts are available to invoke certain functions, control of the windows is fairly mouse-dependent. Specifically, in many window-based GUI environments, a user will expend a considerable amount of mechanical effort repeatedly moving the cursor to the title bar of a window in order to reposition the window, then relocate the cursor to a side or corner of the window in order to resize the window, only to return the cursor to the title bar to once again repeat the sequence if the window is not adequately positioned. This iterative process can quickly become non-productive for users working with multiple windows at the same time, not to mention the physical stress and strain associated with these activities.

In addition, a user will frequently want to "cut and paste" between multiple different windows. This task also will typically require an iterative session of window sizing and positioning activities by the user to display the appropriate window(s) in the appropriate locations with the appropriate sizes. While any of these various inefficiencies, are not, taken alone, tremendously significant or overwhelming, taken together, it is obvious that a great deal of time and effort is wasted in what would otherwise be more productive computer-based activity.

Therefore, there exists a need for an improved widowing environment which will allow the user to more efficiently and effectively control and manage the placement and sizing of windows in any graphical interface environment. Specifically, without an improved mechanism for more precisely controlling the size and placement of multiple, overlapping windows in a GUI environment, the interaction between the computer user and the user interface will remain less than optimal.

SUMMARY OF THE INVENTION

The preferred embodiments of the present invention provide a method and apparatus for managing and controlling the size and location of windows in a GUI-based computer system. Specifically, a window control mechanism is provided to enhance the basic functional features of a window in any windowing environment. By interacting with the window control mechanism, a user can quickly and easily relocate and resize a window without unnecessary mouse movement. In one preferred embodiment of the present invention, the user invokes the window control mechanism by positioning the cursor over the title bar of a window and using both buttons of a two button mouse. In another preferred embodiment of the present invention, the user invokes the window control mechanism by positioning the cursor over a window decoration and using both buttons of a two button mouse. Yet another preferred embodiment of the present invention allows the user to specify a keyboard keystroke combination to invoke the window control mechanism.

BEST MODE FOR CARRYING OUT THE INVENTION

Figure 1:
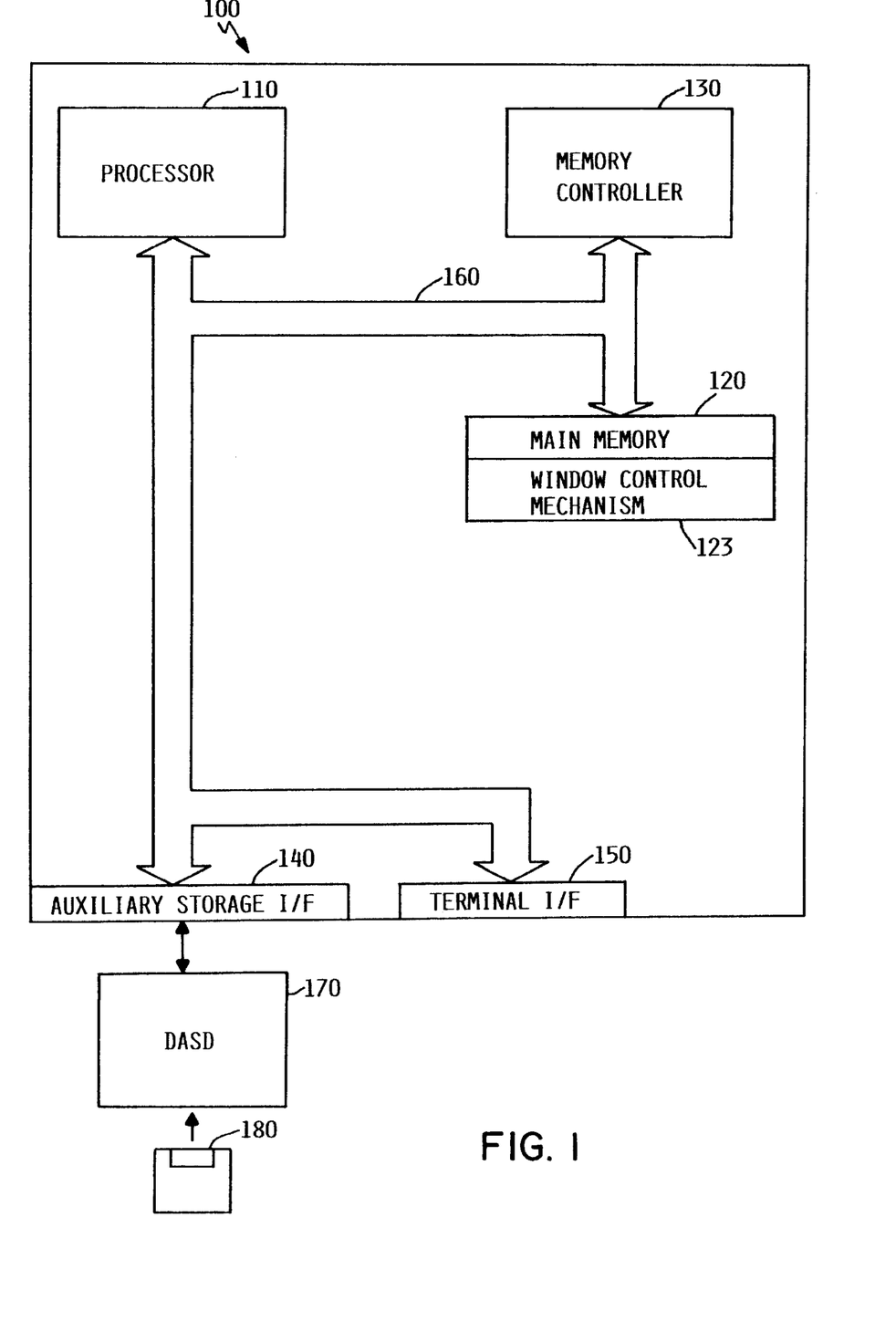
FIG. 1 is a block diagram of a computer system in accordance with a preferred embodiment of the present invention.

Referring now to FIG. 1, a computer system in accordance with a preferred embodiment of the present invention includes: a Central Processing Unit (CPU) or processor 110; a terminal interface 150; an auxiliary storage interface 140; a Direct Access Storage Device (DASD) 170; a floppy disk 180; a bus 160; and a memory 120. In this example, memory 120 includes a window control mechanism 123. It should be understood that bus 160 is used to load window control mechanism 123 into memory 120 for execution. The functionality and implementation of window control mechanism 123 will be explained in greater detail below.

Processor 110 performs computation and control functions of system 100. Processor 110 associated with system 100 may comprise a single integrated circuit, such as a microprocessor, or may comprise any suitable number of integrated circuit devices and/or circuit boards working in cooperation to accomplish the functions of a central processing unit. Processor 110 is capable of suitably executing the programs contained within memory 120 and acting in response to those programs or other activities that may occur in system 100.

Memory 120 is any type of memory known to those skilled in the art. This would include Dynamic Random Access Memory (DRAM), Static RAM (SRAM), flash memory, cache memory, etc. While not explicitly shown in FIG. 1, memory 120 may be a single type of memory component or may be composed of many different types of memory components. In addition, memory 120 and processor 110 may be distributed across several different computer that collectively comprise system 100. Computer system 100 of FIG. 1 simply illustrates many of the salient features of the invention, without limitation regarding the physical location of processor 110 or memory locations within memory 120.

Bus 160 serves to transmit programs, data, status and other forms of information or signals between the various components of system 100. The preferred embodiment for bus 160 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100. Auxiliary storage interface 140 represents any method of interfacing a storage apparatus to a computer system known to those skilled in the art. Auxiliary storage interface 140 allows auxiliary storage devices such as DASD 170 to be attached to and communicate with the other components of system 100. While only one auxiliary storage interface 140 is shown, the present invention anticipates multiple interfaces and multiple auxiliary storage devices such as DASD 170. As shown in FIG. 1, DASD 170 may be a floppy disk drive which is capable of reading and writing programs or data on disk 180. DASD 170 may also be any other type of DASD known to those skilled in the art. This would include floppy disk drives, CD-ROM drives, hard disk drives, optical drives, etc. Disk 180 represents the corresponding storage medium used with DASD 170. As such, disk 180 can comprise a typical 3.5 inch magnetic media disk, an optical disk, a magnetic tape or any other type of storage medium.

Obviously, system 100 will typically include additional components such as a mouse, a keyboard, a network interface, a modem, etc. that allow system 100 to connect to various computer networks and allow the user of system 100 to communicate over a network connection to a network. The use and operability of these various components are well known to those skilled in the art and, accordingly, are not addressed herein.

In addition, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks, Read Only Memory (ROM), CD-ROMs and transmission type media such as digital and analog communication links.

Figure 2:
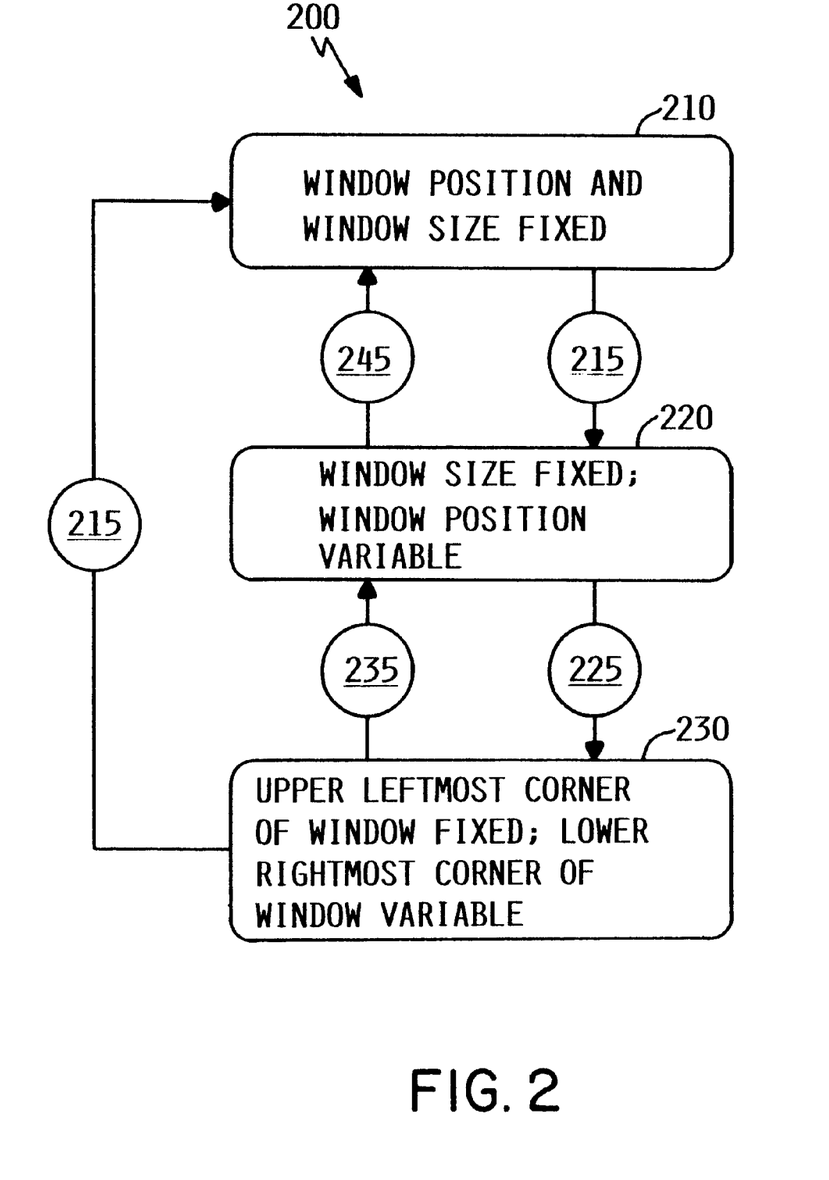
FIG. 2 is a block diagram representing various states which can be invoked using a window control mechanism in accordance with a preferred embodiment of the present invention.

Referring now to FIG. 2, a state diagram 200 representing an implementation of a window control mechanism according to a preferred embodiment of the present invention is illustrated. With most operating systems for GUI environments, user events such as keystrokes, mouse clicks, and cursor movement are "trapped" as they occur and the system will respond with an appropriate action. The system constantly "loops" through a main event loop, waiting for user input. Once the user input has been received and processed, the system will return to the main event loop and wait for additional user input. As shown in FIG. 2, the user of system 100 will cycle through at least three different states relative to window control mechanism 123; state 210, state 220, and state 230. As with the main event loop, the user will cycle from state to state by initiating some user event such as "clicking" and/or holding down a mouse button. All of these states are entered into from the main event loop and are coordinated within the main event loop.

In state 210, both the size and the position of the active window is fixed. For purposes of this example, it is assumed that the user has positioned the cursor over the title bar of the active window. In state 210, no mouse button has been pressed and, therefore, no action related to window control mechanism 123 will take place. The system will remain in state 210 until the user takes some other action. While in state 210, it is possible that some other system-level activity, unrelated to window sizing and positioning, may take place.

To transition from state 210 to state 220, the user performs event 215, which in this example means that the user clicks and holds the left mouse button with the cursor positioned over the title bar of the active window. In state 220, the size of the active window remains fixed and the user can reposition the active window by dragging the cursor to a new location on the screen.

To transition from state 220 to state 230, the user will perform event 225, which in this case means that the user clicks and holds the right mouse button down while simultaneously holding the left mouse button down and maintaining the position of the cursor in the title bar of the active window. It should be noted that each window and title bar has a physical screen geometry (i.e., height and width), and in at least one preferred embodiment, the cursor can suitably be positioned anywhere within the physical screen geometry of the active window or the title bar of the active window and hold down the mouse buttons to activate the window control mechanism. In state 230, the upper leftmost corner of the active window is fixed and the lower rightmost corner of the active window can be repositioned by dragging the cursor until the desired window size is achieved.

To transition from state 230 back to state 220, the user will release the right mouse button and keep holding the left mouse button down (user event 235). As explained above, while in state 220, the size of the active window remains fixed and the user can reposition the active window by dragging the cursor to a new location on the screen.

In a like manner, the user can transition back to state 210 from state 220 by initiating user action 245 which, in this example, equates to releasing the left mouse button. As previously discussed, in state 210 both the size and the position of the active window will be fixed. Similarly, to transition directly back from state 230 back to state 210, the user will release both the left and the right mouse button (user event 255) and, as previously explained, both the size and the position of the active window will be fixed. It should be noted that the use of the left and the right mouse button as described herein is only one example for invoking window control mechanism 123. The desired functionality may be achieved by switching the left and right buttons. In addition, some single mouse button devices may utilize a combination keystroke/mouse click operation to invoke window control mechanism 123. In the most preferred embodiments of the present invention, the exact combination of mouse clicks and/or keystrokes and/or other user events will be a user-configurable option.

One preferred embodiment of the present invention will relocate the cursor to the sizing box in the lower rightmost corner of the active window whenever window control mechanism 123 is activated by the user. This will provide visual feedback to the user and allow the user to quickly determine that the window can be resized. Upon completion of the resizing of the active window, when the user deactivate window control mechanism 123 (i.e., exits state 230), the mouse pointer would be returned to its former position. It should be noted at this point that some user interface guidelines recommend that rapid relocation of the cursor in the window without user control is not desirable and, therefore, other options may be implemented. In an alternative preferred embodiment of the present invention, instead of relocating the cursor on the screen upon activation of window control mechanism 123, the cursor image will change from an arrow to a small icon which suggests the window control functionality of the present invention, similar to the icon shown in FIG. 5.

It should be noted that although state diagram 200 represents the use of two separate events to invoke window control mechanism 123, there are a wide variety of alternative methodologies for invoking window control mechanism 123. For example, a new window decoration could be placed into the title bar of the windows in any standard resizable window in a typical graphical user environment. By initiating the requisite user interaction (i.e., pressing the two mouse buttons) while the mouse is positioned directly over the new window decoration, the user could invoke window control mechanism 123 in the same manner as described above. One possible location and stylistic implementation of a window decoration for invoking window control mechanism 123 is illustrated and further described in conjunction with FIGS. 4 and 5.

Although the present invention has been described for purposes of this example with the user events specified as pressing mouse buttons, those skilled in the art will understand that other user-generated events such as pressing a designated key or keys on the keyboard could be substituted for either one or both of the mouse clicks. It should be understood the user events may comprise any of several different user-initiated actions or interactions with the computer system.

Figure 3A:
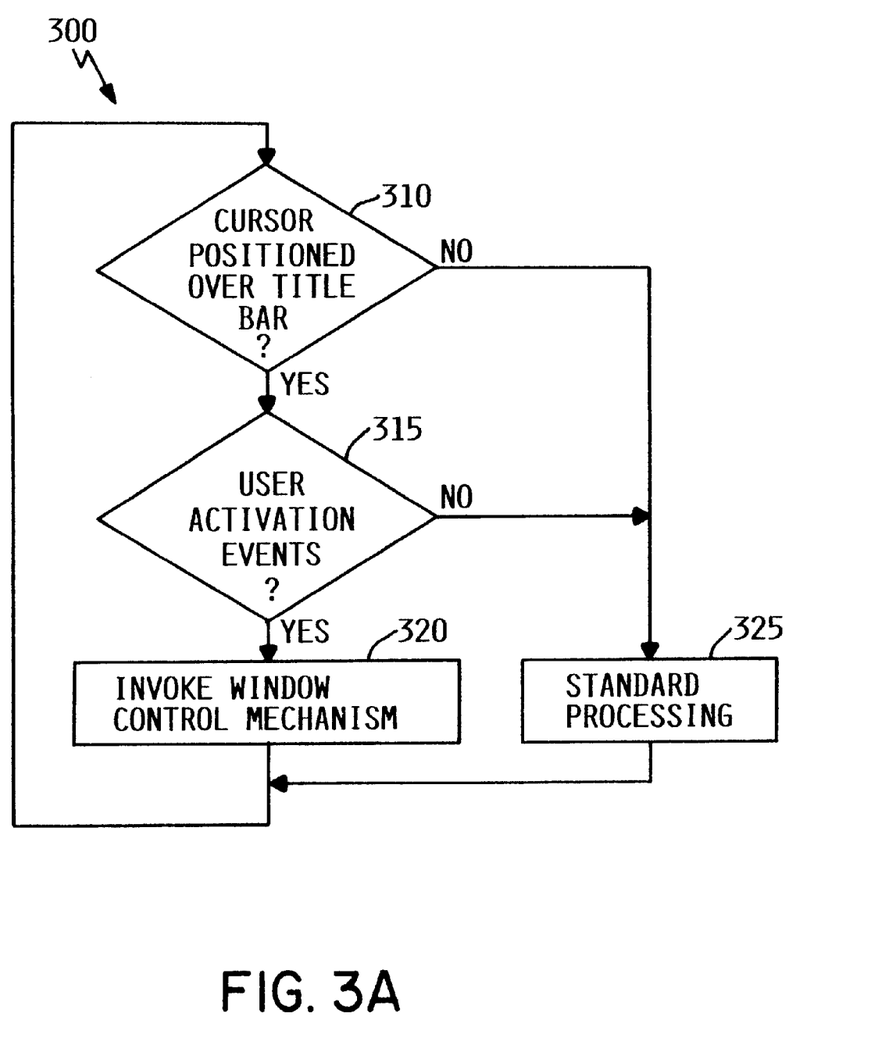
FIG. 3a is a flow chart representing the logic control for an event loop incorporating a window control mechanism in accordance with a preferred embodiment of the present invention.

Referring now to FIG. 3a, a flow chart 300 representing the logic control for an event loop incorporating a window control mechanism according to a preferred embodiment of the present invention is illustrated. As shown in FIG. 3a, the system will continually loop through the steps shown. This loop would be a subset of the larger event loop for the overall system. In step 310, the system will check to see if the cursor is positioned over the title bar. If the cursor is not positioned over the title bar (step 310=NO), then the system will continue with normal or standard processing (step 325).

Normal processing would include other system and user activities not related to window control mechanism 123. However, if the cursor is positioned over the title bar (step 310=YES), then the system will check to see if the requisite user activation events are in place (step 315). As previously explained, these user activation events could include pressing one or more mouse buttons, pressing a designated keystroke combination, etc. If the requisite user activation events are in place (step 315=YES), then the system will invoke window control mechanism 123 (step 320). Otherwise, the system will continue with normal or standard processing (step 325).

Figure 3B:
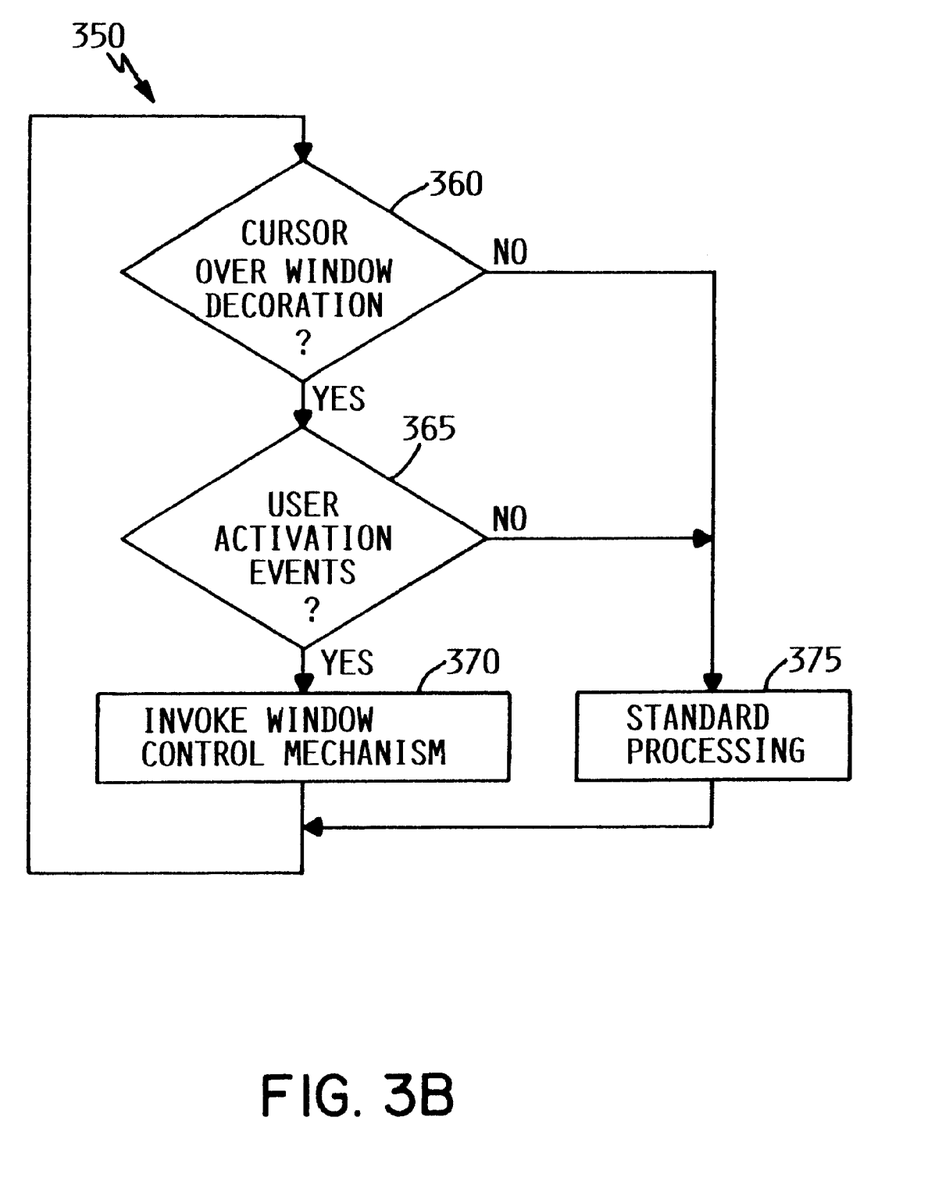
FIG. 3b is a flow chart representing the logic control for an alternative event loop incorporating a window control mechanism in accordance with a preferred embodiment of the present invention.

Referring now to FIG. 3b, a flow chart 350 representing the logic control for an alternative event loop incorporating a window control mechanism according to a preferred embodiment of the present invention is illustrated. As shown in FIG. 3b, the system will continually loop through the steps shown. This loop would be a subset of the larger event loop for the overall system. In step 360, the system will check to see if the cursor is positioned over the window decoration. If the cursor is not positioned over the window decoration(step 360=NO), then the system will continue with normal or standard processing (step 375). Normal processing would include other system and user activities not related to window control mechanism 123. However, if the cursor is positioned over the title bar (step 360=YES), then the system will check to see if the requisite user activation events are in place (step 365). As previously explained, these user activation events could include pressing one or more mouse buttons, pressing a designated keystroke combination, etc. If the requisite user activation events are in place (step 365=YES), then the system will invoke window control mechanism 123 (step 370). Otherwise, the system will continue with normal or standard processing (step 375).

Those skilled in the art will recognize that the steps shown in FIG. 3 can be programmed in many different languages and can be implemented with many different methodologies. It is intended that any implementation of window control mechanism 123 which operates substantially as disclosed herein is considered a preferred embodiment of the present invention.

Whether window control mechanism 123 is invoked by placing the cursor over the title bar of the active window and holding two mouse buttons down or invoked by using a window decoration placed in the title bar, the result is the same. The user can leave the cursor positioned over the title bar or the window decoration in the title bar, resize a window and reposition a window with almost no movement of the mouse or other pointing device by the user. This allows the user to switch quickly between window positioning activities and window resizing activities with very little effort and very little mouse movement. It is anticipated that most GUI environments will be significantly enhanced by this improvement.

Figure 4:
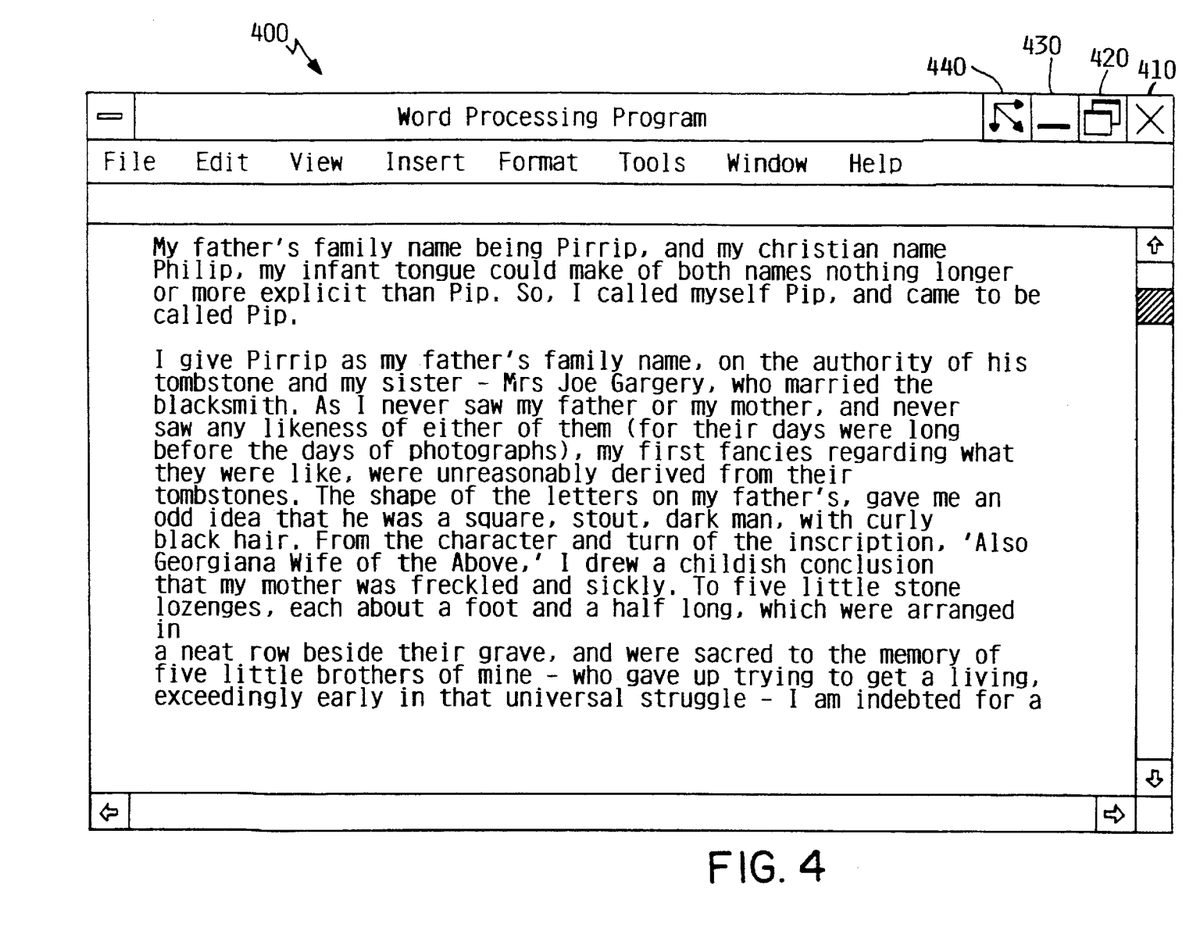
FIG. 4 is a window with an example of a window decoration for invoking a window control mechanism in accordance with a preferred embodiment of the present invention.

Referring now to FIG. 4, a typical window element 400 in a sample graphical user interface environment is illustrated. The title bar for active window 400 incorporates standard window decorations 410, 420, and 430. In typical GUI implementations, window decoration 410 closes active window 400, window decoration 420 changes active window 400 from a first fixed size to a second fixed size, and window decoration 430 removes window 400 from the active view without closing it and places a smaller icon on a task bar to represent the window to the user. In addition, active window 400 also incorporates a new window decoration 440 for invoking a window control mechanism 123 in accordance with a preferred embodiment of the present invention. While decoration 440 is illustrated with a particular shape, style, and location, those skilled in the art will recognize that many other variations are possible. As shown in FIG. 4, window decoration 440 can be designed to fit into a standard window-based GUI environment.

Figure 5:
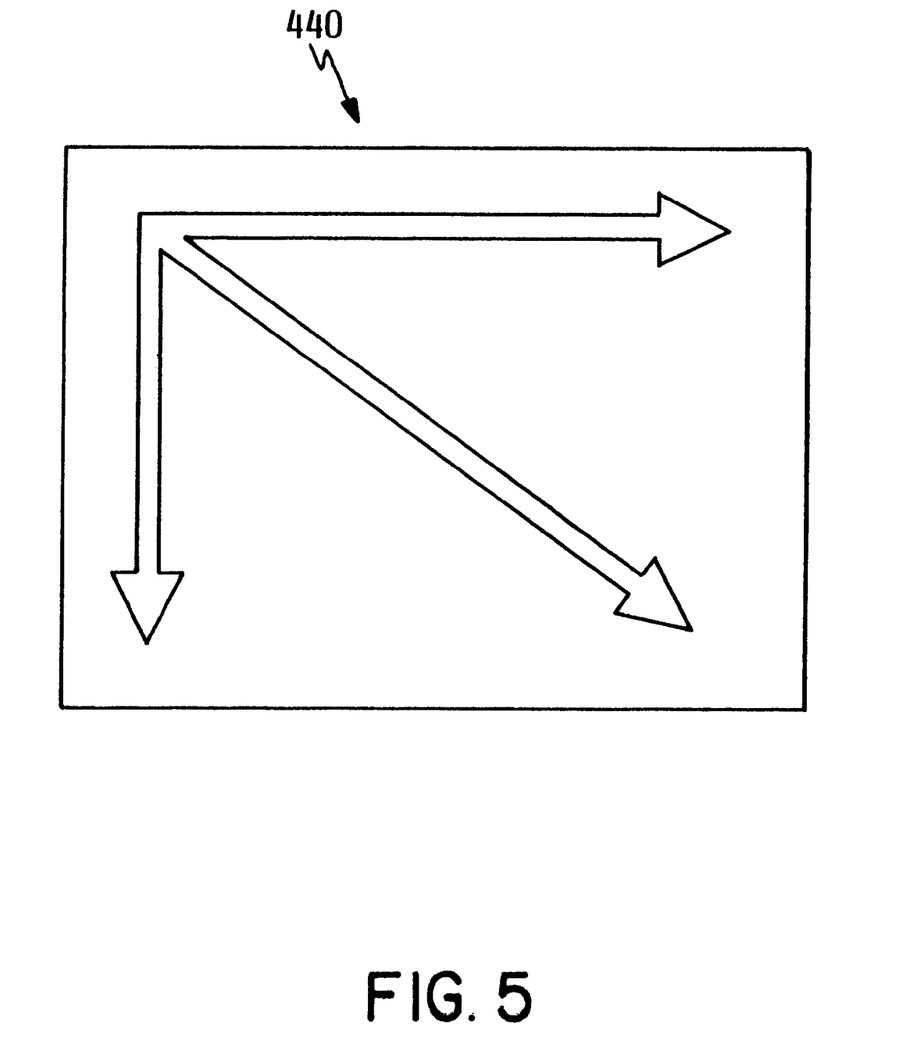
FIG. 5 is a larger representation of the example window decoration of FIG. 4.

Referring now to FIG. 5, window decoration 410 from FIG. 4 is shown in greater detail. By using window decoration 410 and any combination of the user initiated events described above, a user of system 100 (FIG. 1) can directly invoke window control mechanism 123.

As presented herein, a window control mechanism 123 according to the preferred embodiments of the present invention could be implemented using one or more visual indicators such as window decoration 440 described above. Although present conventions dictate placement of window decoration 440 in the title bar, window decoration 440 may be placed in any suitable and convenient location. For example, it may be convenient to place window decoration 440 in the lower rightmost corner of active window 400. Alternatively, as explained above, a combination of mouse click and/or keystrokes could be used to invoke window control mechanism 123. In any implementation, window control mechanism 123 would allow a user to more quickly and easily position and resize windows, thereby increasing productivity and enhancing the GUI environment.

While the invention has been particularly shown and described with reference to an exemplary embodiment in a windowing graphical user interface, those skilled in the art will recognize that the preferred embodiments can be applied to various other types of user interfaces, and that various changes in form and details may be made therein without departing from the spirit and scope of the invention.

What is claimed is:

1. An apparatus for resizing windows in a graphical user interface, the apparatus comprising:

at least one processor;

a memory coupled to the at least one processor;

a window control mechanism residing in the memory, the window control mechanism being activated by a combination of user actions which selectively place the window control mechanism in a first state or a second state from a common cursor position over a tide bar identifying the window, said title bar being an elongated rectangular area located along the top of the window and reserved for displaying a textual title identifying said window, the window control mechanism enabling a user to reposition a window when said window control mechanism is in said first state by moving an x-y input mechanism of a cursor pointing device, said x-y input mechanism receiving an arbitrary two-dimensional input for translation into a corresponding two-dimensional motion on a display with respect to a horizontal axis of said display and a vertical axis of said display, said window following the motion of said x-y input mechanism of said cursor pointing device, and to enlarge the window and reduce the window when said window control mechanism is in said second state by moving said x-y input mechanism of said cursor pointing device, wherein, when said window control mechanism is in said second state, said cursor remains stationary with respect to said horizontal axis of said display and said vertical axis of said display in a substantially fixed position over said title bar in response to motion of said x-y input mechanism of said cursor pointing device, while at least one border of said window other than the top border of said window moves with respect to at least one of said horizontal axis of said display and said vertical axis of said display in response to motion of said x-y input mechanism of said cursor pointing device, thereby altering the size of said window.

2. The apparatus of claim 1 further comprising a mouse and wherein the combination of user actions comprises the user pressing and holding down a first mouse button and a second mouse button located on the mouse.

3. The apparatus of claim 1 further comprising a keyboard and wherein the combination of user actions comprises the user pressing and holding down a first key and a second key located on the keyboard.

4. The apparatus of claim 1 further comprising a keyboard and a mouse and wherein the combination of user actions comprises the user pressing and holding down a key located on the keyboard and a mouse button located on the mouse.

5. The apparatus of claim 1 wherein the title bar comprises a physical screen geometry and wherein the substantially fixed position maintained by the cursor comprises any point within the physical screen geometry of the title bar.

6. A method comprising the steps of:

positioning a cursor in an active window over a title bar identifying the active window, said active window being displayed on a display of a computer system, said title bar being an elongated rectangular area located along the top of the window and reserved for displaying a textual title identifying said window;

activating a window control mechanism by a combination of user actions which selectively place the window control mechanism in a first state or a second state from the position of said cursor over said title bar; and interacting with the window control mechanism to selectively reposition the active window when said window control mechanism is in said first state by moving an x-y input mechanism of a cursor pointing device, said x-y input mechanism receiving an arbitrary two-dimensional input for translation into a corresponding two-dimensional motion on said display with respect to a horizontal of said display and a vertical axis of said display said window following the motion of said x-y input mechanism of said cursor pointing device, and to enlarge the active window and reduce the active window when said window control mechanism is in said second state by moving said x-y input mechanism of said cursor pointing device, wherein, when said window control mechanism is in said second state, said cursor remains stationary with respect to said horizontal axis of said display and said vertical axis of said display in a substantially fixed position over said title bar in response to motion of said x-y input mechanism of said cursor pointing device, while at least one border of said window other than the top border of said window moves with respect to at least one of said horizontal axis of said display and said vertical axis of said display in response to motion of said x-y input mechanism of said cursor pointing device, thereby altering the size of said window.

7. The method of claim 6 wherein the step of activating a window control mechanism comprises the steps of a user pressing and holding down a first mouse button and a second mouse button located on a mouse.

8. The method of claim 6 wherein the step of activating a window control mechanism comprises the steps of a user pressing and holding down a first key and a second key located on a keyboard.

9. The method of claim 6 wherein the step of activating a window control mechanism comprises the steps of a user pressing and holding down a key located on a keyboard and a mouse button located on a mouse.

10. The method of claim 6 wherein a title bar identifies the active window, the title bar comprising a physical screen geometry and wherein the step of positioning the cursor comprises the step of placing the cursor over any point within the physical screen geometry of the title bar.

11. A program product comprising:

a window control mechanism for controlling a window displayed on a display of a computer system, the window control mechanism enabling a user to selectively place the window control mechanism in a first state or a second state from a common cursor position over a title bar identifying the window, said title bar being an elongated rectangular area located along the top of the window and reserved for displaying a textual title identifying said window, whereby the user may reposition a window when said window control mechanism is in said first state by moving an x-y input mechanism of a cursor pointing device, said x-y input mechanism receiving an arbitrary two-dimensional input for translation into a corresponding two-dimensional motion on said display with respect to a horizontal axis of said display and a vertical axis of said display, said window following the motion of said x-y input mechanism of said cursor pointing device, and to enlarge the window and reduce the window when said window control mechanism is in said second state by moving said x-y input mechanism of said cursor pointing device, wherein, when said window control mechanism is in said second state, said cursor remains stationary with respect to said horizontal axis of said display and said vertical axis of said display in a substantially fixed position over said title bar in response to motion of said x-y input mechanism of said cursor pointing device, while at least one border of said window other than the top border of said window moves with respect to at least one of said horizontal axis of said display and said vertical axis of said display in response to motion of said x-y input mechanism of said cursor pointing device, thereby altering the size of said window; and signal bearing media bearing the window control mechanism.

12. The program product of claim 11 wherein the signal bearing media comprises recordable media.

13. The program product of claim 11 wherein the signal bearing media comprises transmission media.

14. The program product of claim 11 wherein the substantially fixed position comprises any location within the physical geometry of a title bar identifying the window.

15. The program product of claim 11 wherein the window control mechanism is activated by a combination of user-initiated events while the cursor is maintained in the substantially fixed position.

16. The program product of claim 15 wherein the combination of user-initiated events comprises a user pressing and holding down a first mouse button and a second mouse button.

17. The program product of claim 15 wherein the combination of user-initiated events comprises a user pressing and holding down a first key and a second key located on a keyboard.

18. The program product of claim 15 wherein the combination of user-initiated events comprises a user pressing and holding down a key located on a keyboard and a mouse button located on a mouse.

* * * * *

UNITED STATES PATENT AND TRADEMARK OFFICE
CERTIFICATE OF CORRECTION

PATENT NO. : 6,181,338 B1  
DATED : January 30, 2001  
INVENTOR(S) : Mark Andrew Brodhun Page 1 of 1

It is certified that error appears in the above-identified patent and that said Letters Patent is hereby corrected as shown below:

Claim 1, column 8,
Line 43, "tide" should be -- title --.

Claim 6, column 9,
Line 41, after "horizontal" insert -- axis --.
Line 42, after "display" insert -- , --.

Signed and Sealed this

Twenty-fifth Day of September, 2001

Attest:

NICHOLAS P. GODICI
Acting Director of the United States Patent and Trademark Office Attesting Officer